March 18, 1930.     R. C. BENNER ET AL     1,751,067
PROCESS OF PRODUCING ELEMENTAL SULPHUR
Filed Sept. 8, 1926
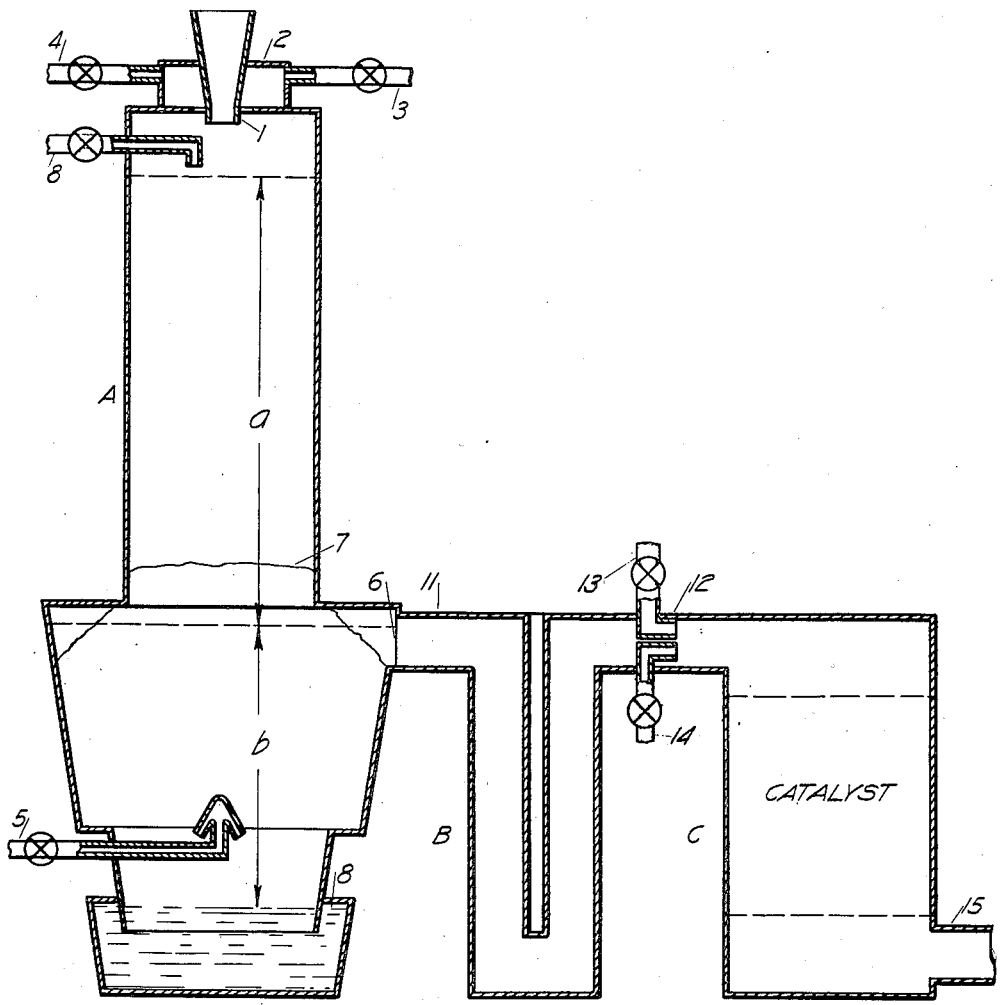
INVENTORS
RAYMOND C. BENNER
ALFRED P. THOMPSON
BY
*Forbes Silsby*
ATTORNEY Patented Mar. 18, 1930

1,751,067

UNITED STATES PATENT OFFICE

RAYMOND C. BENNER, OF BAYSIDE, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

PROCESS OF PRODUCING ELEMENTAL SULPHUR

Application filed September 8, 1926. Serial No. 134,162.

This invention relates in general to improvements in the production of sulphur in the elemental form, and more particularly to the production of elemental sulphur from sulfide ores or from sulphur dioxide and sulfide ores.

In our co-pending U. S. applications Serial No. 134,160, filed September 8, 1926, and Serial No. 134,161, filed September 8, 1926, we have disclosed and claimed methods for the production of elemental sulphur from sulfide dioxide and sulfide ores by contacting a granular or finely divided mixture of sulfide ore and a carbonaceous material with a gas which may comprise sulphur dioxide. In the present application which constitutes a modification of the processes disclosed in these above specified applications, we disclose a process whereby a powdered sulfide ore such as pyrites or pyrrhotite is mixed with powdered carbonaceous material, or with powdered carbonaceous material and oil, such as collodial fuel, or with liquid fuel and the mixture dispersed into a reduction chamber with a limited amount of air, or with sulphur dioxide, or both, where it is subjected, in co-current flow with the gases present, to a reducing atmosphere, and then, in countercurrent flow with the gases present, to an oxidizing atmosphere to complete the desulphurization to the point desired.

Our invention contemplates the production of elemental sulphur by the reduction of sulphur dioxide by means of a mixture of sulfide ore or ores, such as pyrites or pyrrhotite, and a carbonaceous reducing agent, wherein the sulphur from the ore as well as that introduced in the form of sulphur dioxide is recovered in the elemental form. Our invention further contemplates the production of elemental sulphur directly from sulfide ores by mixing therewith a regulated amount of carbonaceous reducing agent, preferably comprising substantial amounts of hydrocarbons and contacting such mixture with an oxidizing gas exclusive of sulphur dioxide, but comprising free oxygen, as for example air.

The principal objects of our present invention are first, to provide an efficient and economical process for the production of elemental sulphur directly from sulfide ores, whereby substantially complete recovery of all sulphur in the ore is obtained; secondly, to provide a more economical process for the reduction of sulphur dioxide containing gases such as the gases from smelters or roasting furnaces, wherein a considerable portion of a cheaper and more available fuel than coal, namely sulfide ore, may be employed as a heating and reducing agent; thirdly, to provide a process whereby the advantages of powdered fuel combustion may be realized.

The accompanying drawing represents diagrammatically one general arrangement of apparatus for carrying out our novel process. The reduction chamber A is provided at the top with a suitable powdered fuel burner 1, through which a mixture of powdered sulfide ore and carbonaceous reducing agent may be admitted. The solid powdered mixture may be conveyed to the burner, and atomized into the chamber by a current of air or other oxidizing means. In the event that our process is employed for the reduction of sulphur dioxide, the sulphur dioxide gas may be employed to convey and atomize the solid fuel. Alternatively the solid charge may be conveyed to the chamber by a suitable continuous mechanical conveyer and dispersed into the chamber by any well-known device such as rotating cone (not shown). Or a combination of the gaseous and mechanical feeding mechanisms may be employed. Surrounding the burner 1 there is a housing 2 provided with inlets 3 and 4 for admitting air and sulphur dioxide gas respectively as desired, to regulate the proper combustion of the fuel. The housing provides a space where the gases may become thoroughly mixed before entering the chamber.

The mixture of sulfide ore and carbonaceous reducing agent may be prepared in any of the well-known ways which will produce the required degree of fineness. The degree of fineness will be determined by the type of ore and carbonaceous material used, and by the oxidizing power of the atmosphere within the chamber. However, the mixture should be of at least that degree of fineness that will permit the consumption of at least a major portion before it settles from suspension in the gaseous medium.

Near the bottom of the chamber A is an inlet 5 through which air, or a mixture of air and sulphur dioxide may be admitted. Intermediate the top and bottom of the chamber and preferably about one-third of the way from the bottom is an offtake 6 through which the gaseous products of the reduction process are removed. The portion of the chamber above the offtake 6 should be of sufficient length to permit the combustion of a large portion of the powdered fuel.

The powdered sulfide ore and carbonaceous fuel blasted in, or otherwise dispersed, at the top of the chamber A and mixed with a limited amount of air, or sulphur dioxide, or both, travel downwardly through the open zone $a$ co-currently with the gases. In the lower portion of the chamber A, i. e. zone $b$, and preferably extending upward to at least just above the offtake 6, a solid bed 7 of the partially desulphurized ore and carbonaceous material is maintained. The solid particles in the descending gas stream fall upon the bed and are retained, while the gaseous products pass through a portion of the bed to the offtake 6. By this method of "filtering", the gaseous products from the zone $a$ are purified from a major portion of the suspended particles therein and reach the offtake in a more or less clean state. The oxidizing gas entering the inlet 5 travels upwardly through the bed 7 counter-current to the solid material thereby completing the oxidation of the ore and fuel.

The reactions which take place in the various parts of the chamber A may be most conveniently described with reference to the zones $a$ and $b$. By way of illustration we will describe the operation of our process when employing pyrites as the sulfide ore and bituminous coal as the carbonaceous reducing agent.

In the zone $a$ the solid charge is suspended in the gaseous medium and the atmosphere is maintained in a reducing state by a proper regulation of the proportion of coal. Only enough air or free oxygen is admitted at the burner to maintain the required temperature.

We may, if desired, supply the required heat externally of the chamber, in which case little or no free oxygen or air is added to the sulphur dioxide gas mixture which may be introduced with the solid charge. The volatile matter of the coal is liberated with the production of coke. The pyrites under the influence of heat, decomposes to yield free sulphur according to the equation $$FeS_2 + heat \rightarrow FeS + S$$

A part of the sulphur thus freed may react with the volatile matter of the coal to yield hydrogen sulfide.

The sulphur dioxide which is present either by the introduction of the gas with the solid charge, (when employing our process for the reduction of sulphur dioxide), or which may be produced by the oxidation of some of the sulfide ore with the limited air introduced at the burner, will be reduced by the volatile matter of the coal and by the coke to yield sulphur vapor, hydrogen sulfide, steam, etc. Also a portion of the sulphur dioxide will be reduced by the FeS according to the equation $$3FeS + 2SO_2 \rightarrow Fe_3O_4 + 5S$$

The heat required for maintaining the reduction process is supplied by the oxidation of the carbonaceous material with the sulphur dioxide and air and by the oxidation of the iron sulfide to $Fe_2O_3$ or $Fe_3O_4$ with the free oxygen present. We have found that the temperature of the reduction chamber should be about 700–800° C. or above for efficient operation.

The solid material falling from the zone $a$ to zone $b$ comprises chiefly iron oxide, iron sulfide, (FeS), and any unburned coke. In this bottom zone $b$, the atmosphere is quite strongly oxidizing in the lower portion due to the admission of considerable amounts of air, with or without sulphur dioxide, through the inlet 5. The oxidizing intensity, however, diminishes progressively toward the upper portion of the zone, and the atmosphere may be slightly reducing near the offtake 6. The unoxidized FeS is completely burned by the air admitted through the inlet 5, yielding sulphur dioxide and $Fe_3O_4$. Any excess air beyond that required to oxidize all the sulfide ore and carbonaceous fuel, is avoided. This sulphur dioxide, together with any which may be introduced with the air, is at least partially reduced by the coke in the upper portion of the zone $b$, to yield free sulphur. The heat developed by these oxidation reactions also serves to provide a portion of the heat required to maintain the temperature in the zone $a$.

It is desirable to maintain the zone $a$ as strongly reducing as possible. To accomplish this and to provide for easy regulation of the reducing atmosphere we have found it advantageous to provide an inlet 8 at or near the top of the chamber through which petroleum oil or other liquid or gaseous hydrocarbons may be introduced. It will be obvious to one skilled in the art that the strength of the reducing atmosphere might be varied by a variation in the proportion of coal, but the latter is not subject to such delicate control, while the introduction of the liquid hydrocarbons not only permits fine regulation but also readily controls the strength of the reducing atmosphere.

As more particularly pointed out in our co-pending applications Serial No. 91,675, filed March 2, 1926, and Serial No. 134,160, filed September 8, 1926, we prefer to employ a carbonaceous reducing agent comprising considerable amounts of volatile hydrocarbons since the presence of such hydrocarbons permits lower temperatures for reduction of the sulphur dioxide and also prevents the formation of objectionable carbon oxysulfide. Likewise the presence of a highly porous coke, produced in zone $a$, in the solid charge falling to the bed 7 in zone $b$, serves to maintain the charge porous and permit uniform reaction throughout.

The gaseous products of zone $a$ comprise chiefly sulphur vapor, hydrogen sulfide, hydrocarbons, carbon monoxide and nitrogen, while those of the lower zone $b$ comprise sulphur vapor, sulphur dioxide, carbon monoxide and carbon dioxide, and nitrogen. The upward and downward gas streams are mingled and removed at the offtake 6. The gaseous products may also carry along some ash, dust, or unburned fuel which are not retained by the bed 7. To remove these solid particles the gases are conducted by the conduit 11 to a dust settling chamber B. The chamber is preferably heat insulated to maintain the temperature of the gases to prevent the condensation of the sulphur vapor.

To provide for the complete interaction of the reducing gases and any unreduced sulphur dioxide which may be present in the gas mixture coming from the dust settling chamber B, the mixture is conducted by a conduit 12 to a chamber C. In the chamber C there is provided a suitable catalyst to aid in the interaction. To regulate the composition of the gases entering the catalyst chamber C, we have provided in the conduit 12, inlets 13 and 14, through which an oxidizing gas such as sulphur dioxide or air, and a reducing agent such as oil or carbon monoxide, respectively, may be introduced. If the gas mixture from the settling chamber comprises an excess of oxidizing gases, a reducing agent will be added, or if the mixture comprises an excess of reducing gases, an oxidizing agent will be added. By a proper control of the amount of oxidizing and reducing agents, depending on the composition of the products of the reduction chamber, which are admitted, the composition of the gaseous mixture entering the catalyst chamber may be adjusted so that there will be present in the mixture interacting proportions of reducing and reducible gases. The production of elemental sulphur will occur according to the following typical equations:

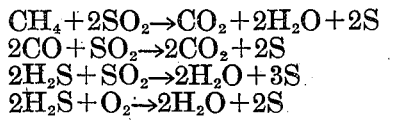

$$CH_4 + 2SO_2 \rightarrow CO_2 + 2H_2O + 2S$$
$$2CO + SO_2 \rightarrow 2CO_2 + 2S$$
$$2H_2S + SO_2 \rightarrow 2H_2O + 3S$$
$$2H_2S + O_2 \rightarrow 2H_2O + 2S$$

The sulphur vapor thus produced in the catalyst chamber supplements that portion produced in the reduction chamber so that there is approximately complete recovery in the elemental form of all the sulphur introduced into the system.

The ash and cinder produced in the process may be eliminated in any of several ways as will be apparent to one skilled in the art. When employing only moderate quantities of sulfide ore, and a comparatively large proportion of coal, the temperature of the reduction process will ordinarily be maintained below that at which the ash and cinder will fuse, and therefore such ash and cinder may be discharged as an unsintered product by such well-known means as a water seal as shown at 18. When employing larger proportions of sulfide ore, the temperature of the reduction process will ordinarily be maintained somewhat higher, and the ash and cinder will tend to fuse or sinter. Such fused or sintered mass will reach the discharge means in a substantially solid state and may be discharged by the well-known methods applicable thereto, such as, for example, the ram discharge method employed in the high temperature gas producers. When, however, a very large proportion of sulfide ore is employed it will be found most satisfactory to discharge the ash and cinder in the form of slag. This may be accomplished by the addition of suitable proportions of lime and silica to the charge and increasing the temperature in the lower zone of the chamber whereby an easily fusible calcium iron silicate is produced in the bottom of the reduction chamber and may be tapped off.

In case the ore contains valuable metal constituents, as for example copper, the desulphurizing process will preferably not be carried to completion but will be operated to produce a matte rich in the valuable metal sulfide, and the slag and matte will be separately removed as in the well-known pyritic smelting operations.

The temperature of the catalyst chamber C should be maintained at about 350° C. or above to prevent the condensation of the sulphur vapor and provide for rapid interaction of the gases. This temperature will be readily obtained by the sensible heat in the gaseous products from the reduction chamber and by the heat of interaction of reducing and reducible gases.

The sulphur vapor and inert gases are removed from the catalyst chamber through the outlet 15 and the sulphur vapor condensed by any suitable heat interchange apparatus, as for example a waste heat boiler, and collected. The gases leaving the condenser may be treated to remove any residual sulphur mist or vapor by scrubbing with a baffle scrubber, absorption in oil, etc., or the sulphur mist may be electrically precipitated.

Any of the known catalysts for aiding the reduction of sulphur dioxide such as iron oxide, calcium sulfate, calcium sulfide, etc., may be employed in the catalyst chamber. We have found, however, that particularly good results are obtained when using bauxite, a natural occurring mixture comprising the oxides of alumina and iron. Of the various types of bauxite, the variety commonly known as French bauxite has been found to be particularly useful because of its resistance to disintegration at the temperatures employed.

We have specified pyrites or pyrrhotite as suitable sulfide ores in the operation of our novel process. This is, however, only by way of example, since other sulfide ores or concentrates of similar type may be used with similar advantages.

Likewise we have referred to the use of bituminous coal as the preferred type of reducing means. But it will be obvious that other coals and carbonaceous material may be used although when employing carbonaceous materials containing small amounts of volatile hydrocarbons we find it preferable to add oil or other liquid hydrocarbons to overcome this deficiency.

According to the preferred method of carrying out our novel process, the charge will contain 10% or more of carbonaceous fuel and in case our process is employed in the reduction of $SO_2$ in a gas comprising 5-10% of this substance, the proportion of carbonaceous fuel may be as high as 50% or more. When employing these proportions of ore and carbonaceous fuel we practically dispense with the use of steam.

Steam may however be employed in the operation of our process to regulate the temperature and to aid in the desulphurization of the ore according to the well-known methods.

The term "oxidizing gas" as employed throughout the specification and claims is intended to include suphur dioxide gas as well as a gas comprising free oxygen, such as air. It also includes such gases as comprise more free oxygen than air, for example commercial oxygen or oxygen enriched air.

The operation may be carried out at normal pressure or at increased pressures, in which latter case the entire system will be maintained under positive pressure, i. e. of the order of several atmospheres.

Various modifications may be made in our novel process without departing from the spirit thereof, and we do not wish to limit the scope except as defined in the appended claims.

We claim:

1. The process of producing elemental sulphur which comprises the step of atomizing, with an oxidizing gas, a mixture of sulfide ore and a carbonaceous material comprising substantial amounts of hydrocarbons, into a reducing atmosphere.

2. The process of producing elemental sulphur which comprises the step of atomizing with an oxidizing gas comprising substantial amounts of sulphur dioxide, a mixture of sulfide ore and a carbonaceous material comprising substantial amounts of hydrocarbons, into a reducing atmosphere.

3. The process of producing elemental sulphur which comprises treating a dispersed powdered mixture of sulfide ore and carbonaceous material comprising substantial amounts of hydrocarbons in a reducing atmosphere, introducing a limited amount of an oxidizing gas with said mixture, and subsequently contacting the mixture in an oxidizing atmosphere with an oxidizing gas comprising free oxygen in counter-current flow.

4. The process of producing elemental sulphur which comprises treating a dispersed powdered mixture of sulfide ore and carbonaceous material comprising substantial amounts of hydrocarbons in a reducing atmosphere, introducing an oxidizing gas comprising substantial amounts of sulphur dioxide with said mixture, and subsequently contacting the mixture in an oxidizing atmosphere with an oxidizing gas comprising free oxygen in counter-current flow.

5. The process of producing elemental sulphur which comprises dispersing with an oxidizing gas, a mixture of sulfide ore and carbonaceous material comprising hydrocarbons, into a reducing atmosphere, passing the gaseous products through a bed of the solid products, and subsequently contacting the solids in an oxidizing atmosphere with an oxidizing gas comprising free oxygen in counter-current flow.

6. The process of producing elemental sulphur which comprises dispersing with an oxidizing gas comprising substantial amounts of sulphur dioxide a mixture of sulfide ore and carbonaceous material comprising hydrocarbons into a reducing atmosphere, passing the gaseous products through a bed of the solid products, and subsequently contacting the solids in an oxidizing atmosphere with an oxidizing gas comprising free oxygen in counter-current flow.

7. The process of producing elemental sulphur which comprises treating a dispersed powdered mixture of pyrites and bituminous coal in a reducing atmosphere, introducing a limited amount of an oxidizing gas with said mixture, and subsequently contacting the mixture in an oxidizing atmosphere with an oxidizing gas comprising free oxygen in counter-current flow.

8. The process of producing elemental sulphur which comprises treating a dispersed powdered mixture of sulfide ore and carbonaceous material comprising substantial amounts of hydrocarbons in a reducing atmosphere, introducing a limited amount of an oxidizing gas with said mixture, subsequently contacting the mixture in an oxidizing atmosphere with an oxidizing gas comprising free oxygen in counter-current flow, removing the gases of both co-current and counter-current streams at a point intermediate thereof, regulating the composition of such gases by the addition of an oxidizing or reducing agent to provide substantially interacting proportions of reducing and reducible gases, and passing such mixture in contact with a suitable catalyst to complete the interaction to yield elemental sulphur.

9. The process of producing elemental sulphur which comprises treating a dispersed powdered mixture of sulfide ore and carbonaceous material comprising substantial amounts of hydrocarbons in a reducing atmosphere, introducing an oxidizing gas comprising substantial amounts of sulphur dioxide with said mixture, subsequently contacting the mixture in an oxidizing atmosphere with an oxidizing gas comprising free oxygen in counter-current flow, removing the gases of both co-current and counter-current streams at a point intermediate thereof, regulating the composition of such gases by the addition of an oxidizing or reducing agent to provide substantially interacting proportions of reducing and reducible gases and passing such mixture, while heated, in contact with a suitable catalyst to complete the interaction to yield elemental sulphur.

10. The process of producing elemental sulphur which comprises treating a dispersed powdered mixture of sulfide ore and carbonaceaus material comprising substantial amounts of hydrocarbons in a reducing atmosphere, introducing an oxidizing gas comprising sulphur dioxide with said mixture, subsequently contacting the mixture in an oxidizing atmosphere with an oxidizing gas comprising free oxygen in counter-current flow, regulating the amount of sulfide ore to provide a major portion of the heat required for the reduction process by the oxidation of said ore, and regulating the amount of carbonaceous material to reduce substantially all the sulphur in the system to the elemental from.

11. The process of producing elemental sulphur which comprises treating a dispersed powdered mixture of sulfide ore and carbonaceous material comprising substantial amounts of hydrocarbons in a reducing atmosphere, introducing an oxidizing gas comprising sulphur dioxide with said mixture, passing the gaseous products through a bed of the solid products, subsequently contacting the solids in an oxidizing atmosphere with an oxidizing gas comprising free oxygen in counter-current flow, regulating the amount of sulfide ore to provide a major portion of the heat required for the reduction process by the oxidation of said ore, regulating the amount of carbonaceous material to reduce substantially all the sulphur in the system to the elemental form, removing the gaseous products of both co-current and counter-current streams at a point intermediate thereof, regulating the composition of such gaseous products by the addition of an oxidizing or reducing agent to provide substantially or interacting proportions of reducing and reducible gases and passing such mixture, while heated, in contact with a suitable catalyst to complete the interaction to yield elemental sulphur.

12. The process of producing elemental sulphur which comprises mixing pyrites with powdered coal, dispersing the mixture into a chamber with an oxygen containing gas, causing a self-supporting combustion to occur producing as reaction products sulphur in vapor form, sulphur dioxide, carbon monoxide, hydrogen sulfide, iron sulfide and other iron compounds, hydrocarbons and coke, freeing the gaseous reaction products including carbon monoxide, sulphur, sulphur dioxide and hydrogen sulfide from the solid reaction products including iron sulfide, other compounds of iron and coke, blowing oxygen containing gas through the solid reaction products to burn the iron sulfide and coke, producing sulphur dioxide, ash and cinder, removing the ash and cinder, mixing the carbon monoxide, sulphur vapor, sulphur dioxide and hydrogen sulfide first mentioned with the sulphur dioxide last mentioned, passing the resulting gases in contact with a catalyst, and recovering the sulphur in the elemental form.

13. The process of producing elemental sulphur which comprises the step of introducing sulfide ore and carbonaceous material in finely divided dispersed form into a reducing atmosphere.

14. The process of producing elemental sulphur which comprises the step of atomizing with an oxidizing gas, a mixture of sulfide ore and carbonaceous material into a reducing atmosphere.

15. The process of producing elemental sulphur which comprises the steps of introducing sulfide ore and carbonaceous material in finely divided dispersed form into a reduction chamber, permitting the said ore and carbonaceous material to travel downwardly through an upper open portion of said chamber, maintaining a bed of the solid products of the reaction in a lower portion of said chamber, contacting an oxidizing gas with said bed, and withdrawing the gaseous products from the chamber at a point intermediate the upper and lower portions of said chamber.

16. The process of producing elemental sulphur which comprises the steps of introducing sulfide ore and carbonaceous material in finely divided dispersed form into a reduction chamber, permitting the said ore and carbonaceous material to travel downwardly through an open portion of said chamber in co-current flow with the gaseous products of the reaction, maintaining a bed of the solid products of the reaction in a lower portion of said chamber, passing the gaseous products through said bed, subsequently contacting said bed with an oxidizing gas in countercurrent flow, and withdrawing the products of the co- and counter-current gas streams at a point intermediate thereof.

In testimony whereof, we affix our signatures.

RAYMOND C. BENNER.
ALFRED P. THOMPSON.